March 18, 1941.  R. C. CHATTIN  2,235,670
IRRIGATION DITCHER
Original Filed March 16, 1937  3 Sheets-Sheet 1
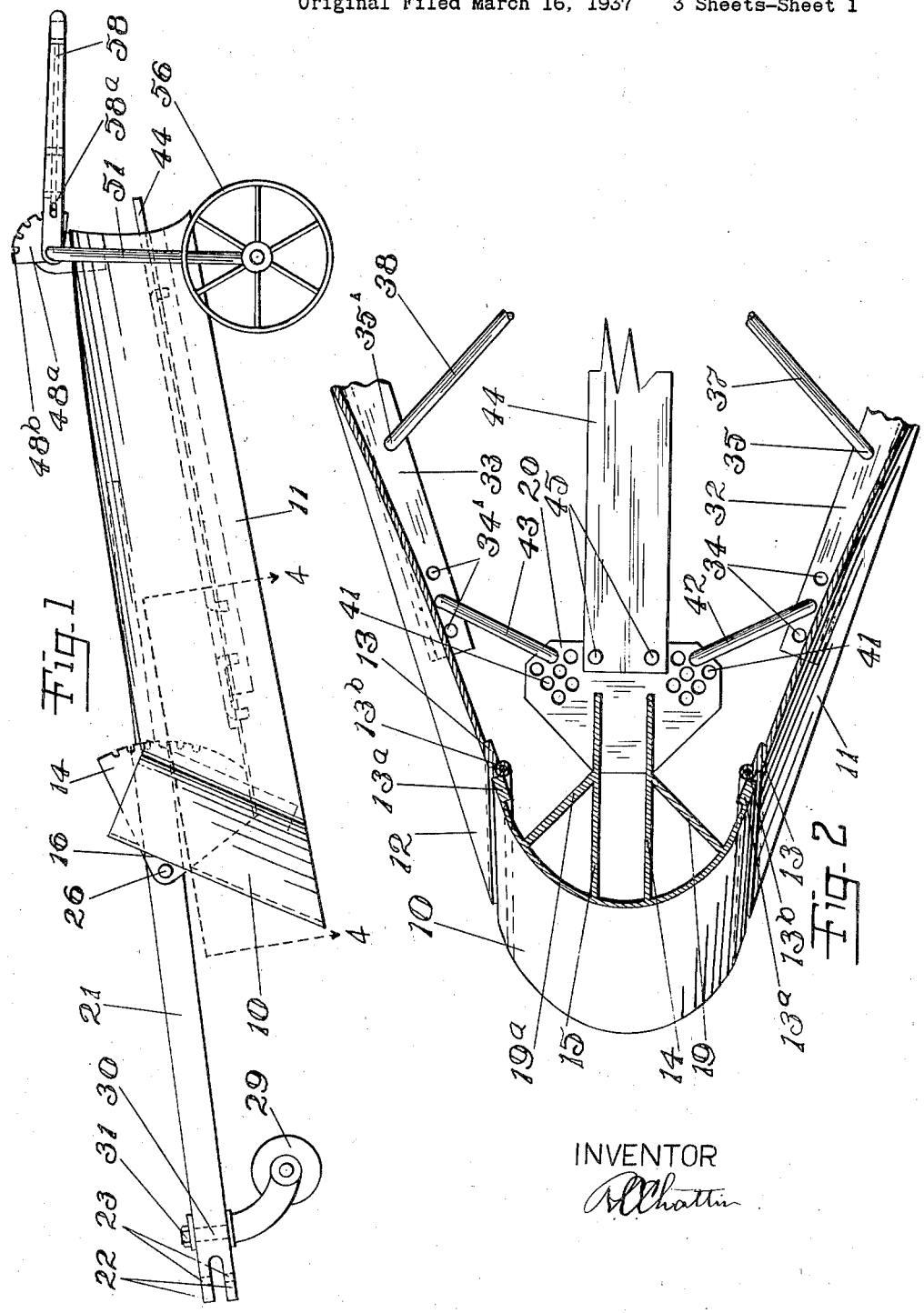
INVENTOR
R. C. Chattin

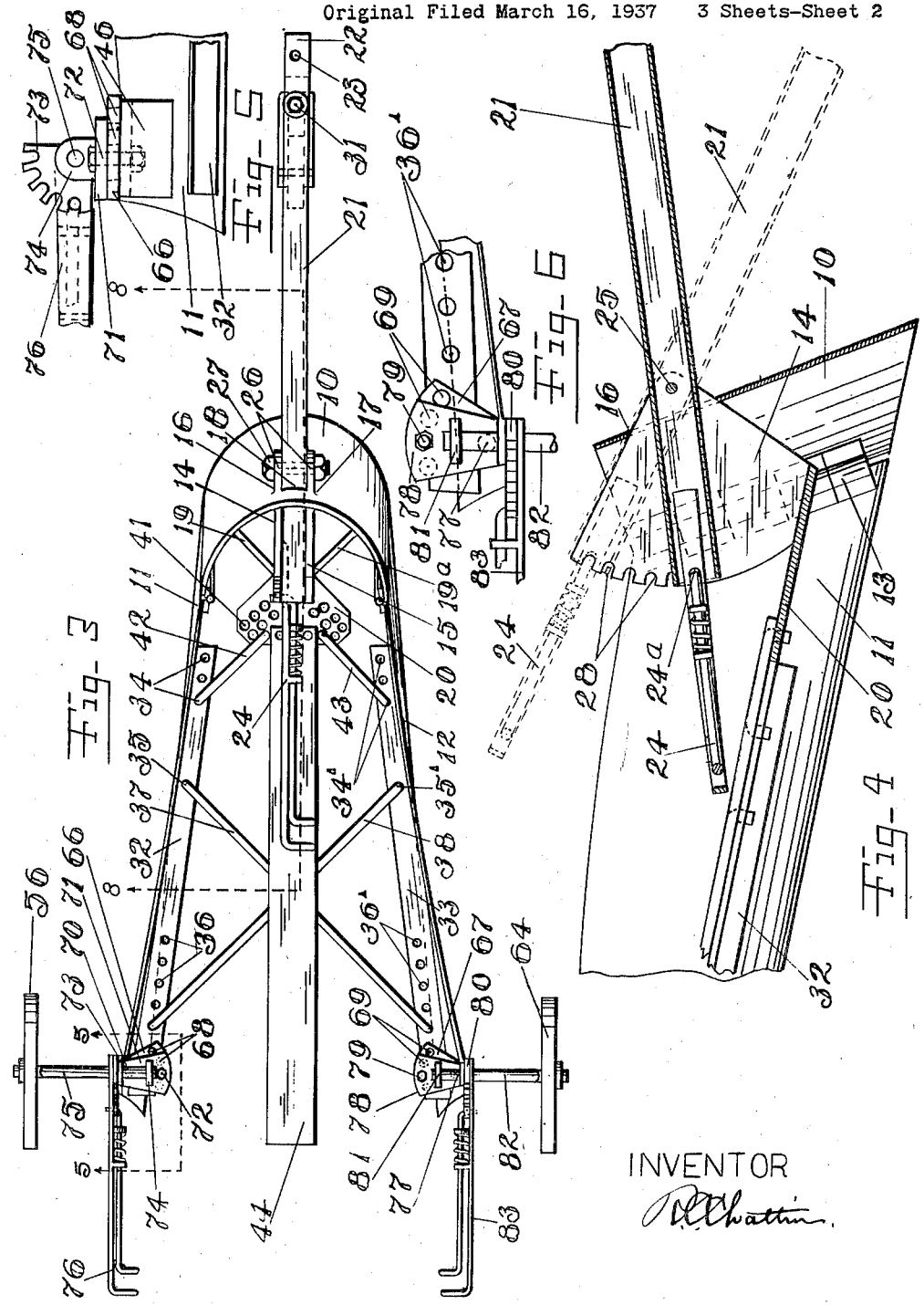

March 18, 1941.     R. C. CHATTIN     2,235,670
IRRIGATION DITCHER
Original Filed March 16, 1937    3 Sheets-Sheet 3
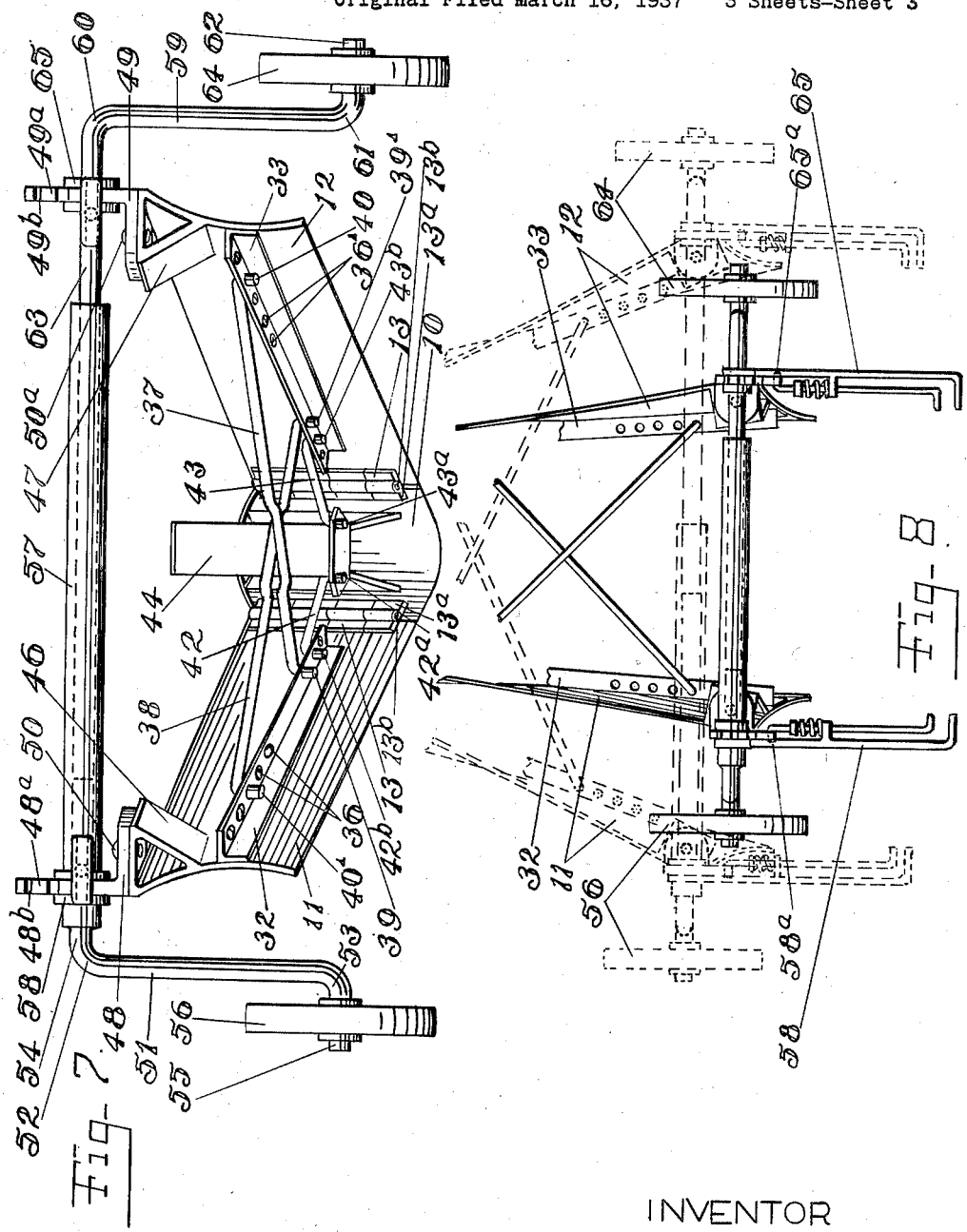
INVENTOR
R. C. Chattin Patented Mar. 18, 1941

2,235,670

UNITED STATES PATENT OFFICE 2,235,670

IRRIGATION DITCHER

Robert C. Chattin, Boise, Idaho

Refiled for abandoned application Serial No. 131,189, March 16, 1937. This application July 14, 1939, Serial No. 284,511

5 Claims. (Cl. 37—98)

This invention relates to the improvement of irrigation ditchers such as is shown in my prior Patent No. 1,477,033 granted December 11, 1923. This application is a substitute for my earlier application S. N. 131,189, filed March 16, 1937, and since abandoned.

The object of the invention is to provide new and useful improvements to the ditcher by the addition of several new parts, also by the rearrangement of some of the parts described in my prior invention above mentioned, whereby the ditcher is made more adaptable to use, both in the building of new ditches and in the cleaning of old ditches of various sizes and shapes.

An object of the invention is to provide an additional means by which the ditcher may be adjusted, to accurately determine the depth of cut made by the front or nose piece. This is secured principally through an adjustable beam, to the front end of which is attached a caster wheel. Said beam may be raised or lowered at its forward end, which in turn regulates the depth to which the front piece is allowed to cut.

A further object of the invention is involved in the means providing for the quick and easy adjustment of the wing members, relative to the front or nose piece, permitting the wings to be swung in a horizontal plane relative to the nose piece, and also to be held in rigid adjustment.

A further object is to provide adjustable means whereby the rear of the wings may be raised or lowered independently of each other, to keep the machine level on hillside work, or to throw uneven amounts of the material removed to either side of the ditch as may be desired.

A further feature of the invention is involved in the means provided for the adjusting of the various parts for the construction and cleaning of ditches of various widths, depths and cross sections.

Another feature of the invention is involved in the means provided whereby the cut made by the wings may be accurately regulated. This is secured by the adjustment of the rear wheels to raise and lower the wings and also by closing the wings together or by spreading them apart.

Another feature of the invention is involved in the means provided whereby the ditcher is transported on wheels when being moved from place to place. These and other objects of the invention are hereinafter more fully described and claimed, and the preferred form of construction and association of the parts involving my invention are shown in the drawings in which—

Fig. 1 is an elevation of the complete machine taken from the wing side.

Fig. 2 is a fragmentary view in horizontal section, taken on the line 4—4 of Fig. 1.

Fig. 3 is a plan view of a modified form of a crank axle mounting thereof.

Fig. 4 is a fragmentary view in vertical section, taken on the line 8—8 of Fig. 3.

Fig. 5 is a fragmentary elevation view of the rear of one wing taken on the line 5—5 from the inside, of Fig. 3.

Fig. 6 is a fragmentary plan view of the rear of one wing of Fig. 3.

Fig. 7 is a view in rear perspective.

Fig. 8 is a fragmentary plan view of the rear portion of the machine.

Referring to the drawings, wherein for the sake of illustration is shown the preferred embodiment of the invention, the numeral 10 designates the front or nose piece of the ditcher, formed from a steel plate into an arc shape, and the numerals 11 and 12 designate the curved wings formed from steel plate, such as are embodied and described in my United States Patent No. 1,477,033.

In the improved construction, to the wings 11 and 12 at their inner forward ends are secured by welding or common means, the hinge members 13, and to the inner rear sides of the nose piece 10, are secured by welding or common means the companion hinge members 13a, through which the removable bolt 13b is positioned, providing the hinge pintle whereupon the wings 11 and 12 are adapted to swing on a substantially vertical axis relative to the nose member 10, which allows the wings to be swung approximately in a horizontal plane. This construction differs from that shown in my former patent above mentioned, and makes the wings adjustable horizontally so that ditches of various widths can be made, or the wings adjusted to clean ditches of various depths or cross sections.

I provide the plate 14 and the companion plate 15, which are in the general shape of a triangle, the forward portions of which protrude through the rectangular hole 18 in the upper part of the nose 10, and are secured to the nose piece by means of welding at 16 and 17 in such a manner that the plates 14 and 15 are approximately parallel. The two plates 19 and 19a are welded to the plates 14 and 15 respectively and also to the inner sides of the nose piece 10 in such a manner as to form rigid braces between the parts 10, 14 and 15. To the lower edges of the plates 14 and 15, the plate 20 is welded, so that it is approximately horizontal, the purpose of which will hereinafter be described.

I provide a heavy beam 21 preferably formed by welding two angle irons together so as to form a square or rectangular beam, the forward end of which is cut in such a manner as to provide an open space between the parts 22 through which the two holes 23 are made. This forms a kind of a clevis in the end of the beam, by which the beam may be attached to the draw bar of a tractor or the like by means of a pin passing through the holes 23. To the rear end of the beam, and on the inside of the beam, the common lever 24 is welded. The hole 25 is drilled thru the beam. When the beam is in position it is placed between the plates 14 and 15 and passed through the aperture 18 in the nose piece, so that the hole 25 in the beam registers with the holes 26, in the plates 14 and 15 and through which the removable bolt 27 is positioned providing a pivot for the beam and the lever 24. The rear end of the plate 14 is formed in an arc in which the notches 28 are provided to receive the pawl 24a of the lever 24, thus it will be readily seen that the forward end of the beam may be adjusted vertically by means of the lever 24.

To the forward end of the beam the common caster wheel 29 is secured by means of passing the caster stem 30 through holes provided in the beam. The upper end of the caster stem is provided with threads upon which the nut 31 is placed, thereby securing the caster wheel assembly to the under side of the beam in such a manner that the caster wheel may rotate approximately in a horizontal plane around the vertical axis of the caster stem 30. The use and action of the beam will be more fully described hereafter.

To the wing 11 on its inner side the angle iron 32 is attached by common means such as welding or riveting, so that it is a little below the middle and extends nearly the full length of the wing. To the wing 12 the angle iron 33 is attached in like manner and in a corresponding position. These angle irons serve a twofold purpose, that of reinforcing the wings, and when used with the adjusting rods they provide a means for adjusting the wings laterally. The angle iron 32 is provided with the apertures 34, 35 and 36, and the angle iron 33 is provided with the apertures 34', 35' and 36'.

The adjustment of the wings about the hinge pintles is secured by means of the two adjusting bars 37 and 38. The bar 37 has pins 39 and 40 at opposite ends thereof preferably formed by forging the same thereon. The bar 38 is constructed in the same manner and has the pins 39' and 40' at the opposite ends thereof.

The pin 39 of the rod 37 is placed in the aperture 35 of angle iron 32 and the pin 40 is placed in one of the apertures 36' of the angle 33. The pin 39' of the rod 38 is placed in the aperture 35' of the angle iron 33, and the pin 40' is placed in one of the apertures 36 of the angle iron 32. With the rods 37 and 38 having fixed distances between the pins, it will readily be observed that the wing members 11 and 12 may be turned about the hinge pintles, to extend outwardly at an angle to the outer rear face of the nose piece 10, or to extend in approximate parallel relation therewith as indicated in Figs. 3 and 5, and be held in rigid adjustment by means of the rods 37 and 38 crossing each other.

It will be observed that the adjusting rods 37 and 38 cross each other, and that by placing the pins 40 and 40' in different but corresponding apertures 36 and 36' the wings 11 and 12 may be adjusted in many positions laterally.

The plate 20 heretofore mentioned is provided with a series of apertures 41. The plate 20 is welded to the lower part and rear of the plates 14 and 15 in such a manner that it is approximately in a horizontal plane with the front ends of the angle irons 32 and 33. The brace rod 42 has pins 42a and 42b at opposite ends thereof preferably forged thereon, and the brace bar 43 is constructed in the same manner and has the pins 43a and 43b at the opposite ends thereof. After the adjusting rods 37 and 38 are in place, the pin 42b of the rod 42 is placed in one of the apertures 34 in the angle iron 32 and the pin 42a is then placed in one of the apertures 41 in the plate 20, which forms a rigid brace between the nose piece and the wing 11.

The pin 43b of the rod 43 is placed in one of the apertures 34' of the angle iron 33 and the pin 43a is placed in one of the apertures 41 in the plate 20, thus forming a rigid brace between the nose piece 10 and the wing 12. It will be readily observed that when the brace rods 42 and 43, and the adjusting rods 37 and 38 are fixed in place the wings are held rigid in relation to the nose piece 10, and also that the wings will be capable of standing heavy compression stresses. It will also be seen that many adjustments of the wings may be made quickly and easily.

The running board 44 preferably of wood is secured at its forward end to the plate 20 by the removable bolts 45. The board extending to the rear lies on the adjusting rods 37 and 38 and provides a place for the operator to ride. The running board is not new, a similar one being shown in my former patent.

To the top of the wing 11, on the inside, at or near the rear, the bracket 46 is secured preferably by welding, in such a manner that the top surface is in substantially a horizontal plane. To the top of the wing 12, the bracket 47 is secured in a like manner. I provide an L shaped member 48 the vertical part of which is in the form of a quadrant 48a in which the notches 48b are cut. The horizontal part of the member 48 is provided with an aperture through which the removable bolt 50 passes and the bracket 46 is also provided with a like aperture and through which the bolt 50 passes thereby securing the quadrant member 48 to the bracket 46 so that the member 48 pivots on the bolt 50. I also provide another L shaped member 49 the vertical part of which is in the form of a quadrant 49a in which the notches 49b are cut, the horizontal part of the member 49 is provided with an aperture through which the removable bolt 50a passes, and the bracket 47 is also provided with a like aperture and through which the bolt 50a passes thereby securing the quadrant member 49 to the bracket 47 so that the member 49 pivots on the bolt 50a.

I provide an axle 51 of high grade steel to resist bending and the axle is bent at the points 52 and 53 to such angles that the ends 54 and 55 are parallel and extend in opposite directions, thus forming a crank axle. The wheel 56 is carried by the end 55 of the axle 51 to which it is secured by common means. The pipe 57 is welded to the end 54 of the axle 51 to make an extension of the axle 51. The pipe axle 57 then passes through an aperture in the quadrant 48a to lie in substantially a horizontal position above the wings and at a right angle to the beam. A common lever 58 better shown in Fig. 1, is secured to the pipe axle 57 preferably by welding, and the pawl 58a of the lever 58 engages the notches 48b of the quadrant 48a. It will be observed that when the lever 58 is in a horizontal position the crank axle 51 is in a vertical position which will raise the rear end of the wing 11, and raising of the lever 58 to a vertical position will move the axle 51 to a horizontal position thereby lowering the rear of the wing 11.

The companion axle 59 is also of high grade steel and is bent at the points 60 and 61 to such angles that the ends 62 and 63 are parallel and extend in opposite directions thus forming a crank axle. The wheel 64 is carried by the axle on the end 62 and is secured to it by common means. The end 63 of the axle 59 is of about the same length as the pipe axle 57, and passes through an aperture in the quadrant 49a and it is then inserted into the pipe axle 57. The common lever 65 better shown in Fig. 8 is secured to the axle 63 preferably by welding so that the pawl 65a of the lever 65 engages the notches 49b of the quadrant 49a. It will be clearly seen that the rear of the wing 12 may be raised or lowered independently of the wing 11 by means of the lever 65, the crank axle 59 and the wheel 64.

With the axles constructed as just described, that is so they telescope, regardless of the angle to which the wing members are adjusted, the wheels 56 and 64 are always parallel, and are also always in parallel relationship with the draw beam.

Referring to Figs. 3, 5, and 6, I show a modified form of crank axle mounting. To the top of the brackets 46 and 47 heretofore described and shown in Fig. 7, I secure the plates 66 and 67 respectively and preferably by welding. The plate 66 is fan shaped and it being larger than the bracket 46, the inner end extends outward from the bracket, and in the end of which the apertures 68 are provided in an arc, using the aperture 70 in the plate 66 and the bracket 46 as a pivot. I also provide a companion plate 71 which has two apertures, one of which corresponds to the aperture 70 in the plate 66, and the aperture 72 which corresponds to the aperture 68 in the plate 66. To the outside end of the plate 71 the quadrant 73 is secured by welding in a vertical position, and between the apertures 70 and 72, the ear 74 is secured by welding to the plate 71 in a vertical position, both the quadrant and the ear are provided with apertures through which an axle passes.

A crank axle 75 is provided which carries the wheel 56 on the lower horizontal end, the upper horizontal end passes through the apertures in the quadrant 73 and the ear 74 far enough to allow a hole to be drilled at right angles to the axle, and through which a cotter pin is passed, which holds the axle from working outward. The common lever 76 is secured to the axle 75 by welding and is so positioned that it co-acts with the quadrant 73. To assemble the axle 75 to the wing 11, bolts are passed through the apertures 70 in the plates 66 and 71, and through the apertures 68 and 72. This construction is a very simple and efficient way of attaching the adjustable axle to the wing. It will be observed that the plate 71 pivots on the bolt which passes through the hole 70, and is secured in position by a bolt passing through the apertures 68 and 72 in the plates 66 and 71 respectively, which provides an adjustable means for keeping the wheels parallel when the wings are adjusted in or out. By means of the lever 76 the crank axle may be moved from a vertical to a horizontal position thereby lowering or raising the rear end of the wing 11 independently of the wing 12.

The plate 67 is secured to the top of the bracket 47 by welding, it is fan shaped and being larger than the bracket 47 the inner end extends outward from the bracket 47, the apertures 69 are provided in the end of the plate 67 in an arc shape using the hole 77 in the plate 67 and the bracket 47 as a pivot.

I also provide a companion plate 78, which has two apertures, one of which corresponds to the aperture 77 in plate 67, and the aperture 79 which corresponds to the apertures 69 in plate 67. To the outside end of plate 78, the quadrant 80 is secured in a vertical position by welding, and between the apertures 77 and 79, the ear 81 is secured in a vertical position to the plate 67 by welding. Both the quadrant 80 and the ear 81 are provided with apertures through which an axle passes. A crank axle 82 is provided which carries the wheel 64 on its lower horizontal end, the upper horizontal end of which passes through the apertures in the quadrant 80 and the ear 81 just far enough to allow a hole to be drilled through the axle 82 at a right angle thereto and through which a cotter pin passes to hold the axle from working outward. To assemble the axle 82 to the wing 12, bolts are passed through the apertures 77 in the plates 67 and 78, and through the apertures 69 and 79 in the plates 67 and 78 respectively, which provides an adjustable means for keeping the wheels parallel when the wings are adjusted laterally. The common lever 83 is secured to the axle 82 by welding, and is so positioned that it co-acts with the quadrant 80 thereby serving the purpose of adjusting the crank axle at various positions from vertical to horizontal, and which raises or lowers the rear of the wing 12 independent of the wing 11.

The construction of this modified form of crank axle mounting is very simple and efficient and is especially desirable on large ditchers of this type that have a large wing spread, which makes the telescoping axle of little value.

It is to be noted that the improvements herein described differ from those shown in my Patent No. 1,477,033, since the wings are adjustable horizontally, and the adjusting means for the elevation of the wings is made by means of levers, crank axles and wheels, where in my former patent it was made by means of an adjustable rudder, which was slow and inefficient. This new improvement allows either wing of the ditcher to be raised or lowered easily and quickly which is very essential when working on hillsides, or when it is desirable to place more of the removed material to either side of the ditch. This adjustment and new improvement is also very useful in adjusting the ditcher to work in either deep or shallow ditches.

From the foregoing description it will be readily observed that when the crank axles are adjusted to a vertical position the rear of the wing members will be held in their highest position, and that while in this position if the beam is adjusted as shown by the dotted lines in Fig. 4, the caster wheel on the forward end of the beam will come in contact with the ground and the nose piece will be lifted up above the ground so that the device may be transported from place to place, without engaging the ground. Also that by adjusting the draw beam up or down the depth of the cut the nose piece will make can be accurately determined.

Fom the above description it wil be understood that the device is designed to secure a wide rounded, or flat bottomed ditch rather than the V type ditch which so many previous ditching devices have been designed to make, and that the device will readily remove the dirt displaced by the wide nose piece, up and onto the ditch bank, by means of the pivoted wings adjustable both laterally and vertically.

Having thus fully described my invention, its utility and mode of operation, what I claim and desire to secure by Letters Patent of the United States is—

1. A ditcher having a forward earth entering member, wings pivotally secured to the forward member for lateral adjustment relative thereto and extending outwardly and rearwardly, a draw beam extending forwardly from said forward member and adjustably connected thereto, means for supporting the forward end of the beam, telescoping crank axles adjustably secured to and near the rear of the wings, wheels carried by said crank axles whereby the ditcher wings may be raised or lowered, and means for adjusting the wings laterally.

2. A ditcher having a forward earth entering member, wings pivotally secured to the forward member for lateral adjustment relative thereto and extending outwardly and rearwardly, a draw beam extending forwardly from said forward member and adjustably connected thereto, means for supporting the forward end of the beam, telescoping crank axles adjustably secured to and near the rear of the wings, wheels carried by said crank axles whereby the ditcher wings may be raised or lowered, and means for adjusting the wings laterally comprising cross members with which to make the said adjustment.

3. A ditcher having a forward earth entering member, wings secured to said member for lateral adjustment relative thereto and extending outwardly and rearwardly, a beam extending forwardly from said forward member and adjustably connected thereto, means for supporting the forward end of the beam, telescoping crank axles adjustably secured to and near the rear of the wings, wheels rotatably secured to said axles, means for adjusting the crank axles whereby by the ditcher wings may be raised or lowered, means for adjusting the wings laterally, and means for securing a rigid adjustment between the rear of the forward member and the approximate forward end of the wings on their inner sides.

4. A ditcher comprising an arc shaped nose having a rounded bottom, curved wings secured to said nose for lateral adjustment relative thereto and extending outwardly and rearwardly, a beam inserted through said nose and adjustably connected thereto, means for supporting the forward end of the beam, ratchet quadrant members secured to and near the rear of the wings, telescoping crank axles secured through said members, wheels rotatably secured to said axles, means for adjusting the crank axles whereby the ditcher wings may be raised or lowered, and means for adjusting the wings laterally.

5. A ditcher having a forward earth entering member having a rounded bottom, wings secured to the forward member for lateral adjustment relative thereto and extending outwardly and rearwardly, a draw beam extending forwardly from said forward member and adjustably connected thereto, means for supporting the forward end of the beam, telescoping crank axles secured to and near the rear of the wings, wheels carried by said crank axles whereby the ditcher wings may be raised or lowered, means for adjusting the wings laterally, and a riding platform secured to the rear of the forward member and extending rearwardly along the central longitudinal axis of the device.

ROBERT C. CHATTIN.